United States Patent [19]

Proctor et al.

[11] Patent Number: 4,982,576

[45] Date of Patent: Jan. 8, 1991

[54] AIR CONDITIONER CHARGING STATION WITH SAME REFRIGERANT RETURN AND METHOD

[75] Inventors: Robert H. Proctor, Rossville; Dennis P. Eichenlaub, Kingstown, both of Md.

[73] Assignee: Murray Corporation, Cockeysville, Md.

[21] Appl. No.: 131,623

[22] Filed: Dec. 10, 1987

[51] Int. Cl.⁵ .................... F25B 45/00; F25B 43/00
[52] U.S. Cl. ........................... 62/292; 62/195; 62/474; 62/503
[58] Field of Search ............... 62/149, 77, 292, 188, 62/192, 195, 474, 475, 468, 470

[56] References Cited

U.S. PATENT DOCUMENTS

| | | | |
|---|---|---|---|
| Re. 32,451 | 7/1987 | Proctor | 62/149 |
| 3,232,070 | 2/1966 | Sparano | 62/149 |
| 3,686,954 | 8/1972 | Motl | 73/432 R |
| 3,699,781 | 10/1972 | Taylor | 62/474 |
| 4,106,306 | 8/1978 | Saunders | 62/149 |
| 4,261,178 | 4/1981 | Cain | 62/149 |
| 4,285,206 | 8/1981 | Koser | 62/126 |
| 4,331,001 | 5/1982 | Jones | 62/474 X |
| 4,363,222 | 12/1982 | Cain | 62/149 |
| 4,364,236 | 12/1982 | Lower et al. | 62/77 |
| 4,476,688 | 10/1984 | Goddard | 62/149 |
| 4,480,446 | 11/1984 | Margulefsky | 62/474 |
| 4,488,409 | 12/1984 | Hara | 62/127 |
| 4,539,817 | 9/1985 | Staggs et al. | 62/149 |
| 4,624,112 | 11/1986 | Proctor | 62/149 |
| 4,646,527 | 3/1987 | Taylor | 62/292 |
| 4,663,940 | 5/1987 | Suzuki | 62/127 |
| 4,688,389 | 8/1987 | Iida | 62/127 |

FOREIGN PATENT DOCUMENTS 818788 8/1959 United Kingdom .................. 62/192

Primary Examiner—Harry B. Tanner
Attorney, Agent, or Firm—King and Schickli

[57] ABSTRACT

An air conditioner charging station withdraws refrigerant from an air conditioner, reclaims it by removing certain materials, and returns the reclaimed refrigerant to the same air conditioner from which it was withdrawn, and also provides new, make-up refrigerant to the air conditioner, in the amount necessary to make a full charge. A microprocessor provides a diagnostic capability, and includes tables of acceptable values of parameters, such as air discharge temperature, suction pressure, etc., for different automobile makes and air conditioner types; provision is made for adjusting the acceptable ranges of such values due to one or more ambient factors, of which ambient relative humidity may be one. The microprocessor, after comparing actual values to acceptable value ranges of the air conditioner operating values, displays possible causes of air conditioner malfunction on a video screen. Self-testing of both the microprocessor and associated electrical elements, and of mechanical elements such as conduits, valves and a scale is performed. The operator may command the microprocessor to display, in smaller print, a relatively large volume of detailed instructional material dealing with specific checking procedures or repair. A separator is provided which has a float-operated switch to limit the amount of liquid accumulated in it, and has an inlet spaced from the float, and a support for dessicant located above the maximum liquid level.

4 Claims, 1 Drawing Sheet

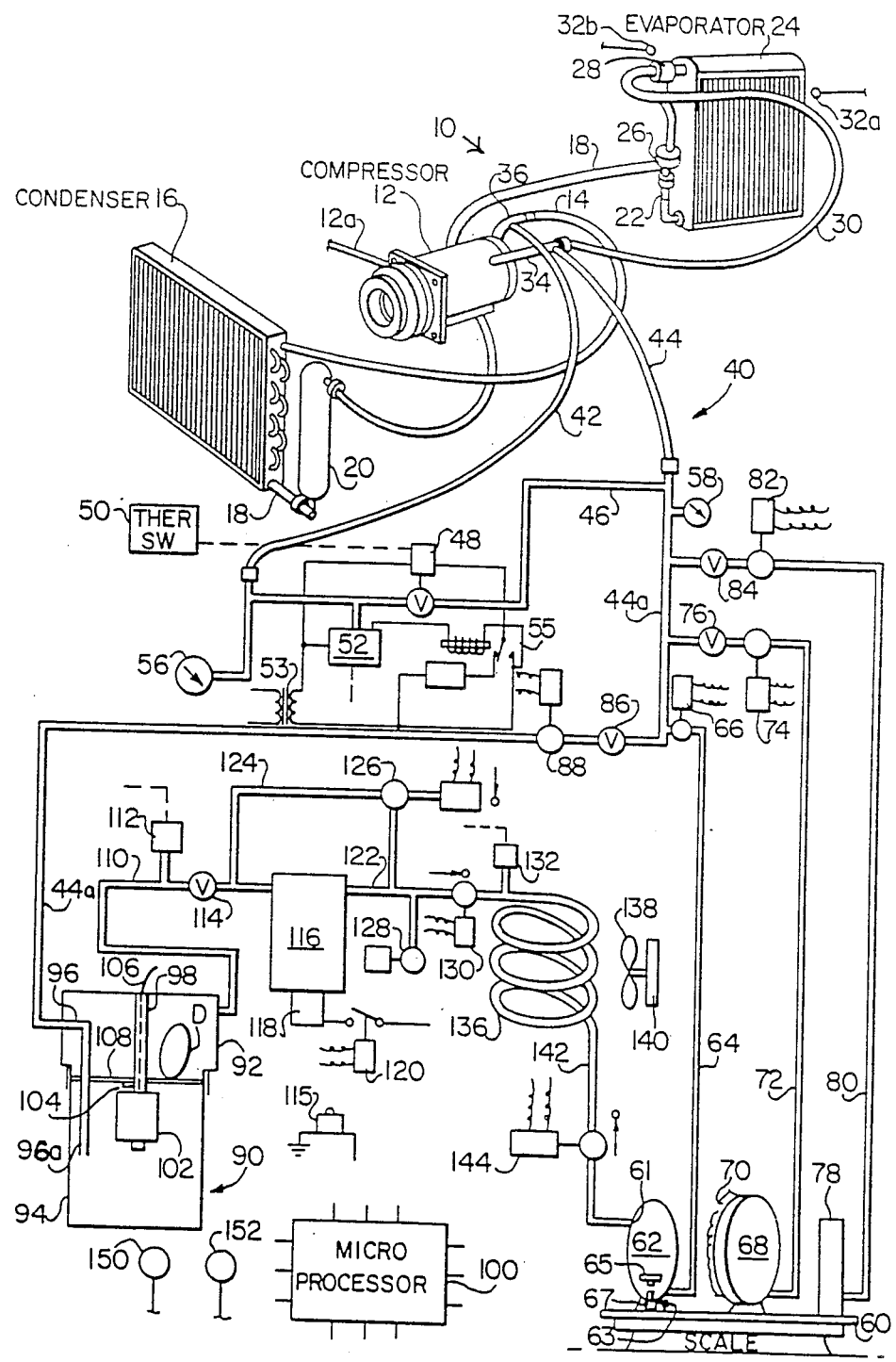

AIR CONDITIONER CHARGING STATION WITH SAME REFRIGERANT RETURN AND METHOD

BACKGROUND OF THE INVENTION

The present invention relates to an automatic air conditioner charging station for charging refrigerant and oil into air conditioner systems, such as automobile air conditioner systems.

A number of apparatus have been provided for automatically charging such air conditioners. Among those are Proctor et al U.S. Pat. No. 4,513,578, now U.S. Pat. Re. 32,451 and Proctor U.S. Pat. No. 4,624,112. The former patent discloses an air conditioner charging station having a weighing scale on which are mounted reservoirs for oil and refrigerant, and an electronic sequencing unit, or microprocessor, which senses the weight loss of the reservoirs as first oil is charged into the air conditioner and then refrigerant is charged into the air conditioner, the amount of each which is charged into the air conditioner being determined by an operator entering into the computer the required amounts of oil and refrigerant for a particular air conditioner. Proctor U.S. Pat. No. 4,624,112 discloses a system of that general type, in which there is provided a conduit connecting the high and low pressure side conduits, called a cross-over conduit, and having a solenoid operated valve in it, together with a solenoid operated dump valve for dumping refrigerant and oil.

Sparano U.S. Pat. No. 3,232,070 conducts withdrawn refrigerant through a compressor and condenser, and then to a drier strainer, from which it is placed into a storage tank.

Taylor U.S. Pat. No. 3,699,781 provides a refrigerant recovery system in which the refrigerant gas is cooled in order to remove liquid by causing condensation in a coil, prior to introduction of the refrigerant into a drier.

Koser U.S. Pat. No. 4,285,206 discloses a system which is capable of simultaneously connecting a refrigerant recovery and purification apparatus to the air conditioner systems of two vehicles, and includes a reclaim refrigerant tank mounted on a scale, and a tank for new refrigerant, one air conditioner system being recharged with reconditioned refrigerant while the other air conditioner system is having the refrigerant therein withdrawn for reclaiming.

Lower et al U.S. Pat. Nos. 4,364,236 and 4,441,330 provide a system in which refrigerant is withdrawn from an air conditioner and passes through a particulate filter, an evaporator, an oil separator, a compressor, a condenser, and to a reservoir, and thence to a purifier, purified refrigerant from the reservoir being charged into an air conditioner being serviced: a microprocessor is used to effect the sequencing of the operations.

Goddard U.S. Pat. No. 4,476,688 discloses a refrigerant recovery and purification system in which refrigerant is withdrawn from an air conditioner and passed through an oil separator and a filter-drier by a compressor and into a receiving tank for the reclaimed refrigerant. The refrigerant is delivered from the reclaim tank, for charging into the air conditioner. A purge valve and a high pressure switch for a condenser are provided to bleed off air when air pressure in the condenser-evaporator becomes excessive. Such excess pressure causes the compressor to be shut down.

Margulefsky et al U.S. Pat. No. 4,480,446 provides a system for rehabilitating refrigerant including a filtering tank with a disc-shaped filter.

Taylor U.S. Pat. No. 4,646,527 provides a refrigerant recovery and purification system which includes a compressor and an oil separator, and accumulators having heat exchange coils in them, the recovered refrigerant being placed in a storage tank: in this system, distillation is utilized to separate oil and other impurities from the refrigerant.

Cain U.S. Pat. Nos. 4,261,178 and 4,363,222 disclose a refrigerant recovery system in which refrigerant is withdrawn and directed to a cylinder on a scale: there is also disclosed a separate system in which a pump produces a vacuum in a tank, which is then connected with an air conditioner in order to remove part of the refrigerant from it.

Staggs et al U.S. Pat. No. 4,539,817 provides a refrigerant recovery apparatus which includes a compressor and filters, and a storage tank.

Saunders U.S. Pat. No. 4,106,306 provides a charging apparatus for charging a refrigeration system of the type having a capillary tube, and discloses an electrical circuit for controlling the charging, which circuit receives data relating to indoor and outdoor temperature, to suction line temperature and to suction line pressure.

There have been provided disclosures of a number of systems, for diagnosing the operation or servicing of air conditioners.

Motl U.S. Pat. No. 3,686,954 provides a system for testing or diagnosing an air conditioner using solenoid valves actuated by manually operated switches; the temperatures and pressures of the system are measured and readouts are provided by gauges.

Suzuki et al U.S. Pat. No. 4,663,940 discloses a self-diagnostic apparatus for an automobile air conditioner which utilizes a microprocessor, input signals to which include sensing the position of dampers in air flow ducts. Also, of general interest are Hara U.S. Pat. No. 4,488,409 and Iida U.S. Pat. No. 4,688,389.

SUMMARY OF THE INVENTION

An air conditioner charging station or apparatus is provided in which refrigerant is withdrawn from an air conditioner, such as in an automobile, is reconditioned or reclaimed, as by removing at least one of such extraneous or contaminant elements as oil, particles of metal, and liquid refrigerant, and there is returned to the air conditioner being serviced substantially only reclaimed refrigerant from that air conditioner. The apparatus includes conduits which are connected to the high pressure and low pressure sides of an air conditioner, there being in the apparatus, in series, a separator, a compressor, a condenser, and a reclaimed refrigerant cylinder or tank. There are also provided a tank containing new refrigerant, and a tank or cylinder of oil, all three tanks or receivers having means to measure the amount of material dispensed, such as a scale upon which they rest. To achieve the return of substantially only the same refrigerant, after it has been reclaimed, to the air conditioner from which it was withdrawn, the amount of reclaimed refrigerant delivered to or from the reclaimed refrigerant cylinder has the quantity thereof measured, as by determining weight added, or lost by dispensing; refrigerant from the new make-up refrigerant cylinder is added to the charge to the air conditioner to the extent necessary, to make up a full charge. Pressure operated switches or transducers are provided at the high and low pressure sides of the compressor of the air conditioner, another at the outlet of the separator and another at the outlet of the compressor. A dump valve is provided for discharging to the atmosphere material such as non-condensible gases, which may have collected in the reclaim cylinder and/or in the condenser, the dump valve being connected to the inlet to the condenser. The reclaim cylinder is located at a lower level than the condenser, so that such gases may rise from the reclaim cylinder to the top of the condenser, for eventual evacuation. The pressure switch at the inlet of the condenser controls, through a microprocessor, the start-up of the compressor, and if there is an unsuitable differential between the inlet and outlet pressures of the compressor, a by-pass circuit is provided for by-passing high pressure refrigerant from the discharge side of the compressor to the inlet side of the compressor, for substantially equalizing the system compressor inlet and outlet pressures.

The separator has a float-operated switch, which may be either a contact switch or a magnetic switch, actuated when the float rises to a predetermined level, the switch controlling, through the microprocessor, the motor for the compressor, so that the compressor is automatically stopped upon the accumulation of a predetermined amount of liquid in the separator. The separator includes a post dependent from a cast metal cap, and a plate on the post above the float supporting dessicant, which is thereby maintained above the liquid level. The post carries the float-operated switch. The inlet of the separator is laterally of and beneath the float, so as to prevent the discharge of material, such as refrigerant and oil, into the separator from affecting the position of the float.

The system includes a microprocessor which, upon receipt of a signal indicating an excess pressure in the condenser, causes the compressor to be stopped for a predetermined time, after which a motor driven fan for the condenser is activated and material is dumped by opening a dump valve, followed by the opening of a by-pass valve and a by-pass line around the compressor.

There is provided, also, a diagnostic apparatus, including a microprocessor which is furnished with input data such as ambient temperature and humidity, discharge pressure, discharge temperature and suction pressure, as well as information relative to cycling of air conditioners having clutches. The microprocessor is also provided with ranges of acceptable values for variable parameters of the air conditioner, and, more particularly, with such acceptable ranges for air conditioners based upon the automobile manufacturer and type of air conditioner in the automobile. Such data is input to the microprocessor by the operator, and formulas for the establishment of acceptable ranges of values are adjusted in accordance with an ambient factor, such as humidity. The microprocessor determines the most likely fault or faults in an air conditioner for a particular set of actual values of such parameters as suction pressure, suction temperature, etc., when compared with the noted acceptable ranges, and provides a signal for the likely cause or causes of a default. These possible defaults are displayed on a video screen for the operator.

Further, there is provision for self-testing of the apparatus including both electronic and electrical components and elements, and mechanical elements such as valves, conduits and a scale. The microprocessor senses, for example, the time required for a pressure charge in a conduit, and compares the sensed time with an established acceptable time.

The microprocessor also provides, upon command, detailed information for conducting a detailed check, or repair, such information being provided by the display of a substantial amount of data in relatively small type, in comparison with the display of general operation instructional data which may be read at a distance from the video screen, as when the operator or mechanic is at the automobile making connections, adjustments, etc.

Among the objects of the present invention is the provision of an air conditioner charging station and method which removes and reconditions refrigerant, and returns to the air conditioner being serviced substantially only reclaimed refrigerant removed from that air conditioner. Another object is to provide an air conditioner charging station apparatus and method in which there is provided a recharging of an air conditioner with substantially only refrigerant removed from that air conditioner and reclaimed, and new refrigerant to the extent necessary to make up a full recharge.

Still another object of the present invention is the provision of an air conditioner charging station in which a separator is provided which has a float-operated cut-off switch for cutting off a compressor, and in which incoming refrigerant does not affect the operation of the float, and, further, a separator for such a system in which dessicant is supported at a level above the highest level of liquid within the separator.

A further object of the present invention is the provision of an air conditioner servicing or charging station having a compressor and a by-pass circuit for equalizing the compressor inlet and discharge pressures.

Yet another object of the present invention is the provision of an air conditioner charging station or apparatus in which evacuation of non-condensible gases is readily achieved from both a receiver for reclaimed refrigerant and a condenser.

Still another object of the present invention is the provision of an air conditioning charging station or apparatus capable of diagnosing any one of a plurality of air conditioners, based on automobile manufacturer and air conditioner type, and displaying to the operator probable causes of faults in the air conditioner being diagnosed.

A still further object is the provision of an air conditioner charging station or apparatus in which there is provided the capability of diagnosing the air conditioner for faults, and for adjusting the acceptable ranges of values in accordance with one or more ambient factors, such as ambient humidity.

Still another object is to provide an air conditioner charging station having a microprocessor and video screen, with the provision of information on operating steps in relatively large letters, for viewing at a distance, and for selectively displaying a large amount of detailed instructions in small letters, for viewing closer to the video screen.

Other objects and many of the attendant advantages of the present invention will be more readily understood from consideration of the following specification, claims and drawings.

BRIEF DESCRIPTION OF THE DRAWING

The single figure of the drawing is partly schematic and representational, showing a conventional air conditioner, and a charging station or system in accordance with the present invention.

DESCRIPTION OF THE PREFERRED EMBODIMENT

Referring now to the drawing, there is shown a conventional air conditioner generally designated 10, such as is typically used in automobiles. The air conditioner 10 includes a compressor 12 having a high pressure side from which fluid refrigerant is conducted by a high pressure conduit 14, which is connected to condenser 16. The discharge conduit 18 of condenser 16 may pass through a receiver-drier 20, and is connected to the inlet conduit 22 of evaporator 24 through expansion valve 26. Expansion valve 26 is controlled in known manner by a temperature sensing element 28 attached to the suction conduit 30 extending from evaporator 24 to the low pressure conduit 34 of compressor 12. The high pressure conduit 14 is connected to the high side of compressor 12 through high pressure conduit 36, and to the high pressure conduit 36 there is connected, through a detachable fitting (not shown) a conduit 42, forming a part of an air conditioner charging station: similarly, to the low pressure conduit 34 there is detachably connected a low pressure conduit 44 forming a part of the air conditioner charging station.

A temperature transducer 32a for sensing the temperature of air entering the evaporator 24 is provided, as well as a temperature transducer 32b for sensing the temperature of air after it has passed through the evaporator 24. There is provided, also, a probe 12a for sensing the cycling of the clutch of the compressor 12.

A crossover conduit 46 is connected to the high pressure conduit 42 and the low pressure conduit 44, there being a solenoid operated crossover valve 48 therein controlled by a thermal transducer switch 50. A pressure operated switch or transducer 52 which senses high side pressure, is also connected to the solenoid valve 48, and to an electronic sequencing unit or microprocessor 100. There is also provided a gauge 56 to show the high side pressure. A gauge 58 will sense and indicate the low side pressure. These gauges are electronically operated digital displays.

Thermal switch or transducer 50 senses ambient temperature and pressure switch or transducer 52 senses the pressure at the high side of the compressor 12, and is activated at a selected pressure, which, for example, is 120 psig: pressure in excess of 120 psig, for example, will cause the solenoid valve 48 to close, to stop the passage of refrigerant from the high side of the compressor until such time as the pressure falls below the selected amount. The solenoid valve 48 is also connected to the microprocessor 100 and receives command signals from it, as will be explained below. However, such command signals may be overridden by a signal from the thermal switch or transducer 50 if ambient temperature is below a predetermined level, such as 60° F.

The air conditioner charging station 40 further comprises a change of amount sensor, specifically a scale 60, which generates signals proportional to changes in weight of refrigerant and/or oil thereon and which is connected to the microprocessor 100. On the scale 60 are a receiving tank 62 for reconditioned refrigerant, having an outlet at the bottom connected to outlet conduit 64 which is connected through a solenoid valve 66 to an extension 44a of the low pressure conduit 44. A cylinder 68 for storing new make-up refrigerant is also on the scale 60 and may be provided with a heater 70. A conduit 72 connects the make-up refrigerant storing cylinder 68 to the low pressure conduit extension 44a through a solenoid valve 74 and a check valve 76 which prevents flow of fluid from conduit 44a into the cylinder 68.

Preferably there is also on scale 60 oil storing cylinder 78, connected by conduit 80 to the low pressure conduit extension 44a through solenoid operated valve 82 and check valve 84.

The low pressure conduit 44, 44a is connected through a check valve 86 and a solenoid valve 88 to a separator 90, for separating from gaseous refrigerant other components which may be in refrigerant withdrawn from the air conditioner 10, including oil, liquid refrigerant and particles, such as metal particles which may have come from bearings in the compressor 12. The separator 90, which is schematically shown, includes a cap 92 which may be a casting of a suitable strong metal, there being attached to it a bowl 94 which depends from it, and which is preferably transparent. Bowl 94 is held to the cap 92 by any suitable releasable holding means such as screw threads. The cap 92 is provided with a suitable hose connecting fitting for attachment to the conduit 44a, and has within it an inlet conduit 96 of angular shape, having an arm 96a which extends downwardly, into bowl 94 and having its discharge outlet at a relatively low level. A post 98 depends downwardly from the cap 92, and has thereon a float 102 which may be caused to rise on post 98 when oil and/or liquid refrigerant has risen to a sufficient height. The post 98 is hollow, and supports a sensor 104 which is engaged by float 102 when liquid in the bowl 94 has reached a certain height, engagement with sensor 104 causing a signal to be sent to microprocessor 100 through conductor 106. A plate 108 is mounted on the post 98, and serves to support dessicant, as may be provided in a small bag D, in the space within separator 90 which will always be above the level of liquid therein. As many bags D as necessary may be provided, and upon disassembly of the bowl 94 from the cap 92, the desiccant may be replaced.

A conduit 110 extends from the separator 90, and gaseous refrigerant leaving the separator 90 will pass through the dessicant and be dried. Because of the low temperature of the gaseous refrigerant above the liquid level in the separator 90, the dessicant will be at a relatively low temperature, and will operate therefore effectively.

Oil from the refrigerant removed from the air conditioner 10 will be caught in the bowl 94 of separator 90, rather than being discharged. There will also remain in the bowl 94 particles and liquid refrigerant. The oil may contain refrigerant which is dissolved in it. Since the separator 90 is subject to ambient temperature, that refrigerant may boil off, and be recovered. The utilization of a transparent bowl 94 will enable the operator to readily ascertain abnormal conditions relating to the oil in the refrigerant withdrawn from the air conditioner 10, such as whether there is no oil or too little oil, or an undue amount of oil. Thus, the operator would be able to ascertain that the air conditioner 10 has either an inadequate supply of oil or an over supply of oil, as the case may be. With this knowledge, he can check for the reason why the proper oil-to-refrigerant ratio in the air conditioner 10 is not within an acceptable range. The bowl 94 is preferably provided with a gauge, so that a determination can quickly be made whether the amount of oil removed from the refrigerant is within the normal range, and if so, can, upon recharging of the air conditioner 10, command the microprocessor 100 to restore the proper amount of oil to air conditioner 10 from the oil storage tank 78. Further, it will be seen that the discharge end of the conduit 96a is below the float 102, so that entering refrigerant will not impact on the float 102 and alter its normal operation. The float 102 will be lifted only by liquid within the bowl 94, and any foam which may be present in bowl 94 will not have a lifting effect on the float 102, so that thereby a true sensing of the liquid level in bowl 94 may be obtained by the sensor or switch 104.

The conduit 110 which extends from the separator 90 has a pressure switch 112 connected to it, for sensing the pressure within the separator 90. A check valve 114 is included in the conduit 110 to prevent backflow of liquid or pressure into the separator 90. The placement of the check valve 114 in the conduit 110 is preferred, although check valve 114 may be either eliminated, or replaced by a solenoid valve.

Gaseous refrigerant from the separator 90 is delivered by the conduit 110 to a compressor 116 which is driven by a motor 118, the power to which is supplied through a solenoid switch 120. The compressor 116 is of a known type, capable of drawing refrigerant from the air conditioner 10 through the separator 90, and compressing the received refrigerant, which is gaseous. A conduit 122 serves to conduct compressed refrigerant from the compressor 116, and has connected to it a by-pass conduit 124 which extends from the conduit 122 to the conduit 110, having a solenoid operated valve 126 therein. As shown by the symbol adjacent to solenoid valve 126, it will be opened by an overpressure from the conduit 110, but an overpressure from conduit 122 will not open it, so that only when solenoid valve 126 is opened through energization of the solenoid will it be opened and refrigerant be permitted to flow through the by-pass conduit 124.

A solenoid operated dump valve 128 is connected to the conduit 122, and there is provided in the conduit 122 a solenoid operated control valve 130. Also in conduit 122 is a pressure switch 132.

Conduit 122 delivers reclaimed, purified and compressed refrigerant to the condenser 136 which is diagrammatically illustrated as comprising a coil: a fan 138 driven by a motor 140 may be caused to blow air across the condenser 136. Condensed refrigerant is delivered through conduit 142 having a solenoid valve 144 therein to the receiver 62, the conduit 142 extending downwardly because the receiver 62 is located at a lower level than the condenser 136, the conduit 142 entering the upper part of the receiver 62.

In operation, the conduits 42 and 44 are connected to the air conditioner 10, and it is assumed that the solenoid valve 48 is closed: it is opened by microprocessor 100 only when charging refrigerant from either the reclaim cylinder 62 or make-up cylinder 68, or when dumping the charge of air conditioner 10, unless it is being closed by the sensing of abnormal temperature by the thermal switch or transducer 50 or abnormal pressure as sensed by the pressure switch or transducer 52. The solenoid valve 88 will be closed, and if the pressure switch 112 which senses the pressure in conduit 110 connecting the separator 90 with the compressor 116 is in the range of 15 to 20 pounds per square inch, pressure switch 112 will cause motor 118 and compressor 116 to be activated. When the pressure falls to approximately 0 psig, solenoid switch 120 will be opened, and the compressor 116 will stop. However, the signal from switch 112 passes through a microprocessor 100 to the solenoid switch 120 (or its equivalent) and under certain circumstances, the signal from pressure switch 112 may be overridden or bypassed, so that, for example, when it is necessary to have the compressor pull a vacuum on the air conditioner 10, this may be effected by the overriding or bypassing by the signal from pressure transducer 112.

The purpose of the bypass conduit 124 is to equalize the high and low pressure sides of the compressor 116 since known air conditioner compressors cannot start if there is differential between the low pressure side and the high pressure side which is too great. A compressor without such limitation would not need the bypass conduit 124. The pressure on the high pressure side of the compressor 116 is sensed by the pressure switch 132 and the pressure on the low pressure side of the compressor 116 is sensed by the pressure switch 112, the signals from these switches being delivered to the microprocessor 100 for processing, and the controlling of the valve 126, to open it, to thereby permit the equalization of the pressures on the high and low pressure sides of compressor 116: when the microprocessor 100 causes the solenoid valve 126 to be opened, to unload the compressor 116, the dump solenoid valve 128 and the solenoid valve 130 in the conduit 122 are both closed. The result is that only small volume of refrigerant flows from the high pressure side of compressor 116 to the low pressure side, and there is not introduced into the conduit 122 refrigerant from the condenser 136. When the compressor 116 is not being unloaded, the bypass solenoid valve 126 is closed and the solenoid valve 130 in the conduit 122 to condenser 136 will be opened. When compressor 116 is restarted, control solenoid valve 130 is opened shortly after bypass valve 126 closes.

In overall operation, the compressor 116 withdraws refrigerant from the air conditioner compressor 12, the refrigerant flowing through the separator where oil, particles, such as metal particles, and liquid refrigerant are removed, with reconditioned gaseous refrigerant then flowing to compressor 116 where it is compressed and delivered to the condenser 136, where it is condensed, and caused to flow into the receiving tank 62 for the withdrawn and reconditioned refrigerant. The microprocessor 100 will determine the difference in the weights on the scale prior to the introduction of the withdrawn and reconditioned refrigerant into the receiving tank 62. That withdrawn, reconditioned refrigerant will pass to the compressor 12 of the air conditioner 10 upon the opening of solenoid valve 66 and the closing of the solenoid valve 144 in the conduit 142 leading to the intake of the receiving tank 62. Thus, there will be returned to the compressor 12 from the receiving tank 62 substantially only refrigerant which was withdrawn from compressor 12. In this way, any contamination which may be present in the refrigerant from one air conditioner system 10 in one automobile will not be mixed with refrigerant from another automobile, so that there is thereby avoided the transfer of contaminants from one air conditioner system to another. Thus, substantially only the same reconditioned refrigerant is returned to the air conditioner from which it is withdrawn, and, with the following exception, no refrigerant from another air conditioner is placed into the air conditioner being serviced. That exception is that a very small amount of refrigerant from a servicing operation on one vehicle air conditioner may remain in the condenser 136, and that very small amount will be delivered to the receiving tank 62 upon the initiation of servicing of a second air conditioner of a second automobile. However, that amount of refrigerant is so small that any contamination will be negligible, due to the extremely small amount of contaminant that may be delivered into the air conditioner of the second vehicle.

If during operation the float 102 rises and strikes the sensor 104, a signal by way of conductor 106 to the microprocessor 100 causes the circuit to motor 118 to be broken, and compressor 116 will stop. There is provided a transparent switch button 115 with a light behind it which flashes at this time, there being provided adjacent to it a legend that the lighted button is to be depressed. Depression of this lighted button-switch will cause the microprocessor to close the solenoid valve 88 and to cause the compressor 116 to operate, to reduce the pressure within the separator 90, the solenoid valve 88 preventing the addition of more freon to separator 90: when the pressure in separator 90 is satisfactorily reduced to approximately 0 psig, this will be sensed by the switch 112, which will provide a signal to microprocessor 100, which will then shut down compressor 116. After that, the bowl 94 may be removed from the cap 92, the bowl emptied and cleaned, and the dessicant bag D replaced.

In some instances, a part of the normal refrigerant charge of a particular air conditioner may have leaked out, so that the amount of withdrawn, reconditioned refrigerant delivered to the receiving tank 62 is not sufficient to provide a complete charge for the air conditioner being serviced. To provide a complete charge, the amount of the deficiency is determined, as explained herein below, and the necessary amount of refrigerant to provide a full charge is withdrawn from the makeup refrigerant cylinder 68. Thus, the air conditioner 10 will receive a full charge made up of one or a first component, which is the same refrigerant that was withdrawn from the air conditioner 10, and which was reconditioned by the separator 90, and to the extent necessary, a second component of new refrigerant from the make up cylinder 68. As is known, a small amount of oil is usually introduced into the air conditioner during recharging, and this is provided from the oil storage tank 78, through conduit 80 when the solenoid valve 82 is opened.

Returning to the figure, the dump solenoid valve 128 is provided to permit dumping of material to atmosphere. That material may be non-condensible gas, which in most cases is air, which may have been contained in the withdrawn refrigerant. That air would be located in the upper or higher part of the condenser 136, at and near the inlet thereof. This non-condensible gas, or air, would have risen from the liquid refrigerant in the coils of the condenser 136 to the highest part of the condenser coil, liquid, being of higher density, being in the lower part of the coil of condenser 136. With the compressor 116 stopped, the solenoid bypass valve 126 will be closed, the condenser valve 130 will be opened, and the dump valve 128 will be opened. Since the condenser 136 is at a higher elevation than the receiving tank 62, any gas which will have accumulated in the receiving tank 62 will, with solenoid valve 144 opened, pass upwardly to and through the condenser coil 136, since the receiving tank 62 is below the condenser 136: that non-condensible gas, or air, will thus, also, be exhausted from the apparatus through the dump solenoid valve 28. This will avoid the incorporation of non-condensible gas, such as air, in the refrigerant which is returned to the air conditioner 10 which is being serviced.

Purging occurs when an excessive pressure, which may be approximately 325 psig, is sensed by the pressure switch 132. When this level of pressure is sensed, the compressor 116 is stopped, by interrupting the flow of current to the motor 118, and the fan 138 is actuated to enhance the condensing action of the condenser 136. After a time delay, the microprocessor 100 causes the condenser solenoid valve 130 and the dump solenoid valve 128 to open to permit the above described dumping function. Subsequently, the bypass valve 126 is opened to equalize the high and low pressure sides of the compressor 116 to facilitate the restarting of the compressor 116. The pressure buildup in the condenser 136 will be caused, for example, when the receiving tank 62 is substantially full, when it may contain some air, together with the withdrawn and reconditioned refrigerant in the liquid state. When the receiving tank 62 is full, no more refrigerant can be pumped into it, so that continued operation of the compressor 116 will cause the noted rise in pressure. Also, if the receiving tank 62 is substantially full, and the temperature rises, the refrigerant in the receiving tank 62 will expand, and since the solenoid valve 66 in the outlet conduit 64 is closed, refrigerant must flow out of receiving tank 62 to the condenser 136. This is permitted by the solenoid valve 144 which permits an override as indicated by the symbol adjacent to it, the higher pressure in the receiving tank 62 forcing the valve off of its seat and refrigerant and/or air passing upwardly to the coil of condenser 136. Valve 144 is normally open, except when the apparatus 40 is dispensing oil or refrigerant. The condenser 136 will have part of its coil or coils filled with liquid, but also part thereof will be filled with high pressure gas. For this reason, there is space in the condenser 136 to accept overflow liquid refrigerant from the receiving tank 62. Any gas, as above-explained, will rise upwardly to the top portion of the coil or coils of condenser 136, and be adjacent the inlet, and will be discharged, as above indicated, during the dumping phase.

Turning now to the operation of the apparatus including the microprocessor, it will be understood that the charging station or apparatus 40 will include necessary switches, such as a main on/off switch, as well as a video display, various signal lights, and a key pad or pads for the entry of commands.

When the apparatus 40 is turned on, a menu will be displayed on the video screen as follows:
Dump and reclaim
Dump to atmosphere
Service
2 oz. shot
Diagnose
Self-test The operator may choose the "Dump and reclaim" operation, and on command, refrigerant will be withdrawn from the compressor 12 of the air conditioner 10, passed through separator 90, compressor 116, condenser 136 and to the receiving cylinder 62. When the suction pressure reaches 0 psig, the apparatus will stop and that operation will have been completed.

If the operator chooses "Dump to atmosphere", the condenser solenoid valve 130 will be closed and the dump solenoid valve 128 will be opened, and the refrigerant will be withdrawn from the air conditioner 10 by compressor 116, passing through separator 90, and will dump to atmosphere, the operation continuing as before, until the pressure of the system is 0 psig, as sensed by pressure transducer 112. This operation will then stop.

In utilizing either the "Dump and reclaim" or the "Dump to atmosphere" modes, if, as sometimes happens, the pressure sensed by pressure transducer 112 rises, the compressor 116 will again by activated. In both of these operations, since the withdrawn refrigerant passes through the separator 90, the operator will be enabled to visually inspect the removed oil through the transparent bowl 94 to determine any abnormalities, as an aid to diagnosing any faults in the air conditioner 10. It is noted that the machine does not turn off when the compressor is stopped during these operations, but remains active so that any rise in pressure will be sensed. Such pressure rise may be due, for example, to effervescence of the refrigerant from the oil in the system.

If the "Service" mode is selected, there is displayed on the video screen a menu of instructions for the operator, requiring him to enter the length of time that the evacuation of the air conditioner system is to proceed, the amount of oil to be charged into the air conditioner, the amount of refrigerant to be charged into the air conditioner, and whether the operator wishes to interrupt operations after the evacuation of the air conditioner in order to evaluate the air conditioner for leaks. It will be understood that this service operation will follow either the above described "Dump and reclaim" operation or "Dump to atmosphere" operation. If the operator does not choose to "dump" but enters a requirement for vacuum, the apparatus automatically performs a "dump and reclaim" function before performing the vacuum function. The operator can cause the function to be "dump to atmosphere" or "vacuum to atmosphere" if he so chooses.

There is also displayed to the operator an option of adding a small amount of refrigerant, such as 2 oz., after the air conditioner has been charged with refrigerant from either receiving tank 62 or make-up refrigerant storage tank 68, or both. This operation may also be performed after the air conditioner 10 has been evacuated, so that it is charged with refrigerant in order that it may be tested for leaks.

The "Diagnose" operation permits the operator, with the aid of the apparatus 40, to diagnose the vast majority of automobile air conditioners now in use to determine if they are functioning satisfactorily, or if not, to determine the cause of the malfunction. When the "Diagnose" function is selected, the video screen will give such instructions as to connect the diagnostic sensors. These are the evaporator input air temperature from the transducer 32a and the evaporator discharge air temperature from the transducer 32b. In addition, an ambient humidity transducer 150 will have been connected to the microprocessor, as well as an ambient temperature transducer 152. The operator will be instructed to start the engine and set it at a selected R.P.M. He is then instructed to check all of the controls and to connect the probe 12a to the clutch of the compressor 12, so that the microprocessor 100 will receive signals indicative of the cycling of the clutch of compressor 12. The controls are required to be set for maximum cold temperature, and the blower (not shown) of the air conditioner 10 to be placed at its highest speed. Also, the operator will be instructed to open both front doors of the automobile, and then to signal the microprocessor 100 when these steps have been accomplished.

The video screen will then signal if the ambient air temperature is outside a preselected range (of between 60° F. and 120° F.), which is the suitable temperature range for conducting tests. If there is sensed a condenser discharge pressure which is too high, such as above 350 psig, this excessive pressure will be displayed on the video screen with instructions to stop the test and correct the problem. Also, if the evaporator or suction pressure is excessive, such as above 150 psig, this information will be displayed with instructions to stop the test and to check hose connections. Assuming that these parameters are within acceptable limits, there will be displayed the names of various automobile manufacturers, and the operator will enter a signal designating the manufacturer of the automobile of which the air conditioner 10 under test is a part. There will then be displayed a menu providing different types of air conditioner systems which are in use including, by way of example, systems which have an expansion valve and a thermostatic switch, and a system having an expansion valve with a pressure switch. The operator will then enter into the register a signal representative of the type of air conditioner system under test. The microprocessor will recognize whether the entered vehicle make and entered air conditioner type are conventional, known combinations, or not. If a selection has been made of, for instance, a manufacturer and a system type which stored data recognized as not being a known combination of data, the video screen will advise the operator that he has chosen an unusual combination of these data and ask if he wishes to change the selection. The operator is then given an opportunity to re-enter his selections of vehicle manufacturer and air conditioner type, and this matter is corrected, if needed.

The microprocessor 100 has stored within it an acceptable range of ambient temperatures for conducting tests, and for each combination of car make and air conditioner type, a range of typical acceptable operating values, specifically, suction pressure, discharge pressure, discharge air temperature, and voltage and/or amperage of the clutch cycling probe 12a. The microprocessor 100 adjusts these values to correct for ambient temperature and/or humidity to provide an ambient adjustment factor for the acceptable range of values.

In particular, formulas have been developed, and are known to workers skilled in the art, of the acceptable ranges of these values. Discharge pressure value range is established by multiplying the ambient factor by approximately 2.55, plus or minus 20 psig. The acceptable suction pressure value range is established by the ambient factor multiplied by 0.5, minus 17, and plus or minus 5. Discharge air temperature value range is established based on the ambient factor times 0.03 plus 19, plus or minus 4, or 32, plus or minus 4. However, it is now recognized that these relationships, to provide acceptable ranges of temperature and pressure, should be modified on the basis of the ambient relative humidity. Therefore, the microprocessor 100 provides for modification of the ambient temperature factor in these relationships, so as to increase them as humidity increases above 30%. There is no modification if the humidity does not exceed 30%, there is a 5% increase in the ambient temperature factor if the humidity is between 30% and 50%; there is an increase of 11% if the ambient relative humidity is between 50% and 70%, and if the ambient relative humidity is above 70%, the temperature factor is increased by 16%.

The microprocessor 100 part for the particular automobile manufacturer and air conditioner system type under diagnosis will then be supplied from the sensors with data as above noted, including ambient temperature and humidity, and will establish the acceptable discharge pressure range, the acceptable suction pressure range, and the acceptable evaporator discharge air temperature range, these acceptable ranges being varied, as above noted, where the sensed ambient relative humidity is above 30%. There is provided below a portion of a chart which is representative of a look-up table forming a part of the microprocessor 100. It will be understood that this representation is for a particular type or particular types of air conditioner and there would be other and different charts for other types of air conditioner within microprocessor 100:

ALL DISPLAYS

301 Ambient temperature is (110). Diagnostic evaluation is only valid from 60° F. to 120° F.
302 Is the ambient temperature probe located in front of the condensor.
303 If temperature reading is incorrect replace the probe.
304 Discharge pressure is (111).
305 Is condensor air flow restricted?
306 Over charge or air in the system—DUMP, EVACUATE AND RECHARGE. PRESS "Proceed"
307 PROCEED (1) {IF "PROCEED" display service screen go to dump and reclaim mode. When pump is "OFF" (0-PSIG) for 10 seconds. Proceed into the charge sequence-return to diagnosis.}
308 Check blower for low air flow
309 Suction pressure is (112)
310 Discharge air temperature is (113)
311 Is the discharge temperature probe properly located?
312 Is Hose connection secure and schrader depressed?
313 System low on charge—If charge is required press "PROCEED"
314 PROCEED (2) {IF "PROCEED" display evacuate and charge screen. When completed return to the diagnosis mode (add a line on the screen)}
315 System diagnosed as normal.
316 Defective evaporator pressure control valve. (EPR-PIA-STV-)
317 Defective expansion valve
318 Restricted receiver dryer
319 Pressure switch not functioning properly.
320 Compressor or clutch malfunction.
322 Restricted orifice tube
323 Defective thermostatic switch
324 Check compressor control valve and O rings.
325 Expansion valve stuck open
326 No power to the clutch As will be apparent, there are many different resulting situations, the numerals in the left hand column being, in effect, commands to display on the video screen the diagnosed fault, or, in the case of numeral 315, that there is no fault diagnosed. There is provided below a table of numerals and displays associated with each:

| | | IF 0.220 CCOT/THERMOSTATIC SWITCH | | | |
|---|---|---|---|---|---|
| AMBIENT TEMP | DISCH PRES | SUCT PRES | DISCH TEMP | AMP PROBE | |
| + | I | I | I | 0 | 301, 302, 303 |
| − | I | I | I | 0 | 301, 302, 303 |
| I | + | 0 | 0 | 0 | 304, 302, 305, 306, 307 |
| I | + | + | 0 | 0 | 304, 309, 308, 302, 305, 306, 307 |
|   | + | + | + | 0 | 304, 309, 310, 311, 302, 305, 306, 307 |
|   | − | 0 | 0 | 0 | 304, 312 |
|   | − | − | 0 | 0 | 304, 309, 312 |
|   | 0 | − | 0 | 0 | 309, 312, 323 |
|   | − | + | + | 0 | 304, 309, 310, 302, 312, 320 |
|   | − | − | − | 0 | 302 |
| 0 | 0 | 0 | 0 | 0 | 315 |
|   | 0 | − | + | 0 | 309, 310, 313, 307, 323 |
|   | − | − | + | 0 | 309, 310, 322, 313, 307 |
|   | 0 | − | − | 0 | 319 |
| I | I | I | I | − | 326 |
| I | I | I | I | * | 327 |
|   |   |   |   | ** | 313, 323 |
|   |   |   |   | −* | 313, 323, 325 |
|   |   |   |   | 0* | 315 |

+ OVER
− UNDER
I IGNORE
0 WITHIN
* CYCLING

By use of the microprocessor 100, and the inputting of data, the operator will be advised of the condition of the air conditioner under test, whether it is satisfactory or, if not, the probable causes of the malfunctions.

If, upon display of the initial menu, the operator selects the "Self-test" function, the program of the microprocessor determines if signals are passing to and being received by the components intended, and in the proper sequence; there is also a testing to determine if these components respond in the manner required, that is, for example, if a solenoid operated valve is signalled to move to the open position, whether it does so. By signals from a pressure transducer or switch adjacent to a solenoid valve, the microprocessor 100 can determine if the valve opens or not, and/or if the related conduit is open or blocked or partially blocked, since it will determine the time required for a drop in pressure of a certain amount, and a sensing that the pressure drop is less than the predetermined amount with a predetermined time will provide an indication of a malfunction in this mechanical part of the apparatus. Similarly, a part of the operation is the discharging of refrigerant from the make-up refrigerant storing tank 68, as for a period of time of two seconds, the microprocessor 100 sensing if the weight loss or amount discharged in that time is substantially equal to a predetermined weight loss or amount discharged, and if not, there will be an indication of malfunctions such as a problem with the scale 60 or alternate amount-determiner such as a flowmeter or a malfunction of the solenoid valve 74, conduit 72, etc. Thus, not only is there a self-checking of the electrical components, but also of mechanical components by the microprocessor 100.

Another function of the microprocessor 100 is a "help" function. The operator may not be aware how a test of the air conditioner 10 should be conducted. He can go to the apparatus 40, and key into the microprocessor 100 a signal for "help". The microprocessor will then display detailed instructions on, for example, how to determine if an expansion valve forming a part of the air conditioner 10 is operating satisfactorily. As the detailed instructions often contain a substantial amount of information, the microprocessor will reduce the size of the letters in order to display more information on the video screen than could otherwise be displayed, the smaller size letters being acceptable since the operator is adjacent to the apparatus 40 and therefore does not require larger sized letters, which are used for the ordinary operations. The larger size letters may be seen, of course, at a greater distance from the apparatus 40, as when the operator is at the vehicle, and following instructions provided by the video screen display dealing with performing functions at the vehicle.

It will be obvious to those skilled in the art that various changes may be made without departing from th e spirit of the invention, and therefore the invention is not limited to that shown in the drawing and described in the specification, but only as indicated in the appended claims.

What is claimed is:

1. Apparatus for servicing an air conditioning system, comprising:

compressor means for withdrawing refrigerant from said air conditioning system and for compressing said refrigerant, means in advance of said compressor means for separating substantially all of any oil, liquid refrigerant and particles in said withdrawn refrigerant from the gaseous component of said refrigerant, said separating means comprising a cap and a body secured thereto, and means for limiting the height of liquid in said separating means, means for condensing refrigerant received from said compressor means, means for receiving said withdrawn, condensed refrigerant having an inlet and an outlet, said inlet being at the highest part thereof, and conduits connecting in series said separating means, said compressor means, said condensing means, and said receiving means, said condensing means being at a higher elevation than said inlet of said withdrawn refrigerant receiving means.

2. The apparatus of claim 1, and further comprising means for supporting dessicant in said separating means above the maximum height of liquid in said separating means.

3. The apparatus of claim 1, and further comprising inlet conduit means extending downwardly into said separator means and having a discharge outlet spaced form the top thereof.

4. Apparatus for servicing an air conditioning system, comprising:

compressor means for withdrawing refrigerant from said air conditioning system and for compressing said refrigerant, means in advance of said compressor means for separating substantially all of any oil, liquid refrigerant and particles in said withdrawn refrigerant from the gaseous component of said withdrawn refrigerant, means for condensing refrigerant received from said compressor means, means for receiving said withdrawn, condensed refrigerant having an inlet and an outlet, said inlet being at the highest part thereof, conduit is connecting in series said separating means, said compressor means, said condensing means, and said receiving means, said condensing means being at a higher elevation than said inlet of said withdrawn refrigerant receiving means and further comprising a motor-driven fan, means for sensing the pressure of fluid in said condensing means and for providing an excess pressure signal, a dump valve connected to the conduit between said compressor means and said condenser means, said last mentioned conduit having a control valve therein, a by-pass conduit connecting the high and low pressure sides of said compressor means having a by-pass valve therein, and sequencing means comprising means, upon receipt of an excess pressure signal from said pressure sensing means, for emitting signals for stopping said compressor means for a predetermined time, for activating said motor-driven fan, for opening said control valve and said dump valve, and for subsequently opening said by-pass valve.

* * * * *